US012390000B2

(12) United States Patent
Moore (10) Patent No.: US 12,390,000 B2
(45) Date of Patent: Aug. 19, 2025

(54) BUNGEE BELT (71) Applicant: Leamon Moore, Tuscaloosa, AL (US)

(72) Inventor: Leamon Moore, Tuscaloosa, AL (US)

( * ) Notice: Subject to any disclaimer, the term of this patent is extended or adjusted under 35 U.S.C. 154(b) by 264 days.

(21) Appl. No.: 17/846,848

(22) Filed: Jun. 22, 2022

(65) Prior Publication Data
US 2022/0400840 A1 Dec. 22, 2022

Related U.S. Application Data (60) Provisional application No. 63/213,472, filed on Jun. 22, 2021.

(51) Int. Cl.
A45F 5/02 (2006.01)
B60P 7/08 (2006.01)

(52) U.S. Cl.
CPC ............ *A45F 5/021* (2013.01); *B60P 7/0823* (2013.01); *B60P 7/0876* (2013.01); *B60P 7/0815* (2013.01)

(58) Field of Classification Search
CPC ..................................................... A45F 5/021
USPC ............... 224/668, 667, 672, 684, 223, 269; D3/224, 215, 218, 219, 221
See application file for complete search history.

(56) References Cited

U.S. PATENT DOCUMENTS

| | | | | |
|---|---|---|---|---|
| 536,598 A * | 4/1895 | Brown | ...................... | A45F 5/02 224/663 |
| 1,416,184 A * | 5/1922 | Flurie | ...................... | F42B 39/02 224/931 |
| 1,589,315 A * | 6/1926 | Johnston | ................. | A45C 11/38 224/908 |
| 1,603,044 A * | 10/1926 | Gise | ...................... | A44C 5/0046 15/224 |
| 2,264,481 A * | 12/1941 | Peterson | ................... | A45F 5/12 294/166 |
| 3,134,416 A * | 5/1964 | Magyar | ................. | A45C 7/0095 294/146 |
| 4,733,808 A * | 3/1988 | Turner, Jr. | .......... | A01M 31/004 224/267 |
| D319,732 S * | 9/1991 | Gumbs | ......................... | D3/229 |
| 5,259,093 A * | 11/1993 | D'Annunzio | ...... | A41D 13/0002 24/3.9 |
| 5,370,288 A * | 12/1994 | Field | ...................... | A45C 13/02 224/256 |

(Continued)

OTHER PUBLICATIONS

MYTEE Products webpage, https://www.myteeproducts.com, accessed Sep. 23, 2022, 3 pages.

*Primary Examiner* — Justin M Larson
(74) *Attorney, Agent, or Firm* — Smith Baluch LLP (57) ABSTRACT Truckers use bungee cords or tarp straps to secure tarps, canvases, and loads on the backs of flatbed trucks and trailers. In some cases, it may take dozens of bungee cords to secure a tarp over the load on a standard flatbed trailer. A bungee belt makes it faster and easier for a trucker to secure a tarp over a load on a flatbed trailer. A bungee belt has belt loops with openings for holding 30 or more bungee cords, allowing the trucker to carry all of the bungee cords for securing a tarp while leaving his or her hands free. The hooks at the ends of the bungee cords fit into the loops, keeping the bungee cords secure while the trucker is wearing the belt. The trucker can remove the bungee cords from the belt one at a time while walking around the flatbed and securing the tarp to the load.

19 Claims, 8 Drawing Sheets

(56) References Cited

U.S. PATENT DOCUMENTS

| | | | | |
|---|---|---|---|---|
| 5,623,750 | A | * | 4/1997 | Nasin ................ B60P 7/0823 24/301 |
| 5,664,712 | A | * | 9/1997 | Smrt .................... A45F 5/02 224/904 |
| D412,243 | S | * | 7/1999 | Shkreli ........................ D3/222 |
| 5,967,391 | A | * | 10/1999 | Hunt ...................... A45F 5/00 224/267 |
| 6,065,659 | A | * | 5/2000 | Faz .................... A61B 50/312 224/684 |
| 6,099,060 | A | * | 8/2000 | Towers ................... A47F 7/00 294/169 |
| 6,129,251 | A | * | 10/2000 | Lajoie ................. A01K 97/10 43/21.2 |
| 6,275,994 | B1 | * | 8/2001 | Lewis ............... A41D 13/0002 2/108 |
| 6,431,420 | B1 | * | 8/2002 | Cragg .................... A45F 5/00 224/684 |
| 6,431,424 | B1 | * | 8/2002 | Smith ................... A45F 3/14 224/675 |
| D501,078 | S | * | 1/2005 | Cabana ........................ D3/215 |
| 7,383,959 | B1 | * | 6/2008 | Rudd ...................... A47F 7/00 211/13.1 |
| D580,257 | S | * | 11/2008 | Squyres ....................... D8/349 |
| 7,770,770 | B2 | * | 8/2010 | Murdoch ............... F41C 33/04 224/675 |
| 8,011,545 | B2 | * | 9/2011 | Murdoch ............... A45F 5/021 224/675 |
| 8,025,192 | B2 | * | 9/2011 | Petzl ................. A62B 35/0025 224/660 |
| D659,516 | S | * | 5/2012 | Schoen ........................ D8/355 |
| 8,256,652 | B2 | * | 9/2012 | Murdoch ............... F41C 33/04 224/675 |
| D686,777 | S | * | 7/2013 | Borgen .................... D29/101.1 |
| 8,474,673 | B2 | * | 7/2013 | Murdoch ............... A45F 5/021 224/675 |
| 8,608,041 | B1 | * | 12/2013 | Adkisson ............... A45F 3/04 2/102 |
| 8,695,176 | B2 | * | 4/2014 | Gangakhedkar ...... B60P 7/0823 24/302 |
| D707,536 | S | * | 6/2014 | Van Riper ..................... D8/367 |
| 9,144,294 | B2 | * | 9/2015 | Gregory ................... A45F 5/02 |
| 9,333,926 | B1 | * | 5/2016 | Henning .................. B60R 11/06 |
| D807,156 | S | * | 1/2018 | Hauser ......................... D8/356 |
| D914,361 | S | * | 3/2021 | Lam ............................. D3/224 |
| D1,002,187 | S | * | 10/2023 | Johnson .................... A45F 5/02 D3/224 |
| D1,012,676 | S | * | 1/2024 | Wang ............................ D8/355 |
| 2007/0119891 | A1 | * | 5/2007 | Lawrence ............... A45F 5/02 224/269 |
| 2007/0205235 | A1 | * | 9/2007 | Knight .................... A45F 5/00 224/681 |
| 2007/0284326 | A1 | * | 12/2007 | Baloun ................. B65D 57/00 211/182 |
| 2010/0193557 | A1 | * | 8/2010 | Clinton ................... A45F 3/02 224/625 |
| 2011/0005041 | A1 | * | 1/2011 | Gangakhedkar ...... B60P 7/0823 24/302 |
| 2012/0085771 | A1 | * | 4/2012 | O'Flaherty ........... B60P 7/0846 220/676 |
| 2015/0102081 | A1 | * | 4/2015 | Ellis ...................... A45F 5/021 224/600 |

* cited by examiner

BUNGEE BELT

CROSS-REFERENCE TO RELATED APPLICATION(S)

This application claims the priority benefit, under 35U.S.C. 119(e), of U.S. Application No. 63/213,472, which was filed on Jun. 22, 2021, and is incorporated herein by reference in its entirety.

BACKGROUND

Truckers use bungee cords or tarp straps to secure tarps, canvases, and loads on the backs of flatbed trucks and trailers. These bungee cords come in a variety of lengths (e.g., 21, 24, or 31 inches) and materials and are also called shock cords or elasticated cords. A typical bungee cord or tarp strap is made of flexible, durable black rubber with a steel S-hook or other hook each end. Each S-hook can be hooked into a rub rail, hook, or D-ring on the flatbed or to a D-ring, eyelet, grommet, or other opening on the tarp, canvas, or load. (In this specification, the terms bungee cord and tarp strap are used interchangeably to refer to an elastic cord with hooks at its ends for securing tarps or other items.) For example, the S-hook on one end of a bungee cord can be secured to the rub rail on the flat bed and the S-hook on the other end of the bungee cord can be secured to a D-ring on a tarp covering the load to hold the tarp in place over the load. Alternatively, the S-hook on one end of a bungee cord can be secured to one portion of the rub rail, the bungee cord can be snaked or fed through a D-ring on the tarp, and the S-hook on the other end of the bungee cord can be secured to another portion of the rub rail to keep the tarp taut over the load. Or the S-hooks can be secured to D-rings, eyelets, or grommets on the tarp and snaked or fed through a rub rail, hook, or D-ring on the flatbed.

SUMMARY

A belt for holding bungee cords or tarp straps for securing a tarp over a load on a flatbed truck can have a width of about four inches and comprise loops to hold S-hooks of the bungee cords. Such a belt can be made of nylon, polyester, Kevlar® synthetic fiber, Nomex® synthetic fiber, Dyneema® synthetic fiber, and/or leather. The loops can be arranged in two parallel rows separated by about one inch. Each loop can be about one and a half inches wide. The belt can include at least sixty loops.

A trucker or other person can use such a "bungee belt" to secure a tarp over a load on a flatbed truck as follows. First, the trucker inserts the S-hooks of the bungee cords or tarp straps into respective loops of the belt. Then the trucker puts on the belt while the S-hooks of the bungee cords are in the respective loops of the belt. (The trucker can also put the belt on first, then put the S-hooks in the respective loops, or put some S-hooks in the loops before putting on the belt, then put the remaining S-hooks in the loops after putting on the belt.) While wearing the belt, the trucker removes the S-hooks of the bungee cords from the respective loops of the belt and secures the tarp over the load with the bungee cords.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Securing a tarp over a flatbed load with bungee cords is a time-consuming process, in part because it can take dozens of bungee cords or tarp straps to secure the tarp properly. It can be difficult to hold more than a few bungee cords or tarp straps at a time because they are bulky and can get tangled up with each other. As a result, most truckers will leave bungee cords or tarp straps someplace convenient, such as in a pile on the flatbed or on the ground, then make several trips back to that pile while securing the tarp over the load. These trips back and forth between the tarp and pile of bungee cords or tarp straps eat into the time that federal and state agencies allow a trucker to work in a day. Since many truckers are paid by the mile, more time securing bungee cords or tarp straps means less time driving and a lower income.

Figure 1A:
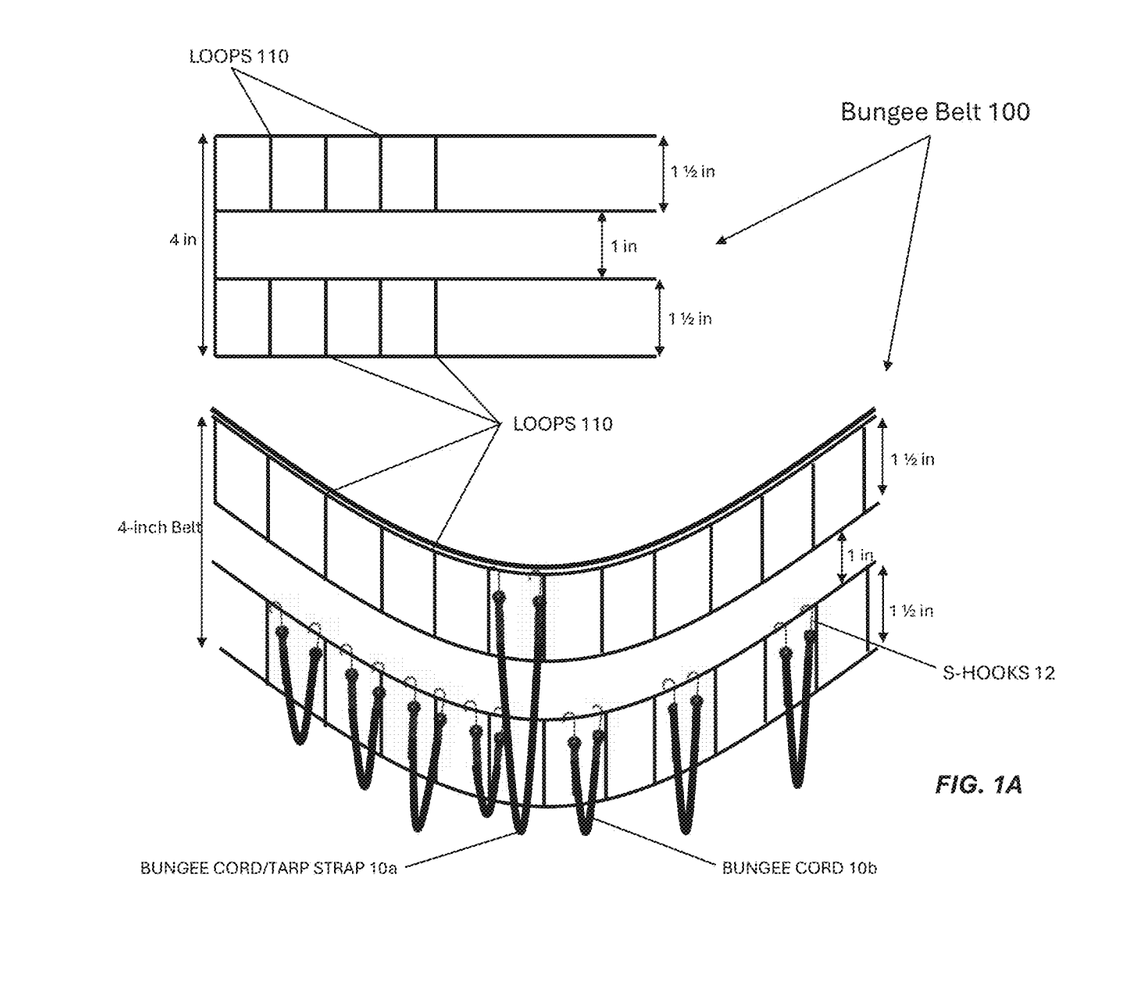
FIG. 1A shows a perspective view of a bungee belt with two parallel rows of loops holding several bungee cords.
Figure 1B:
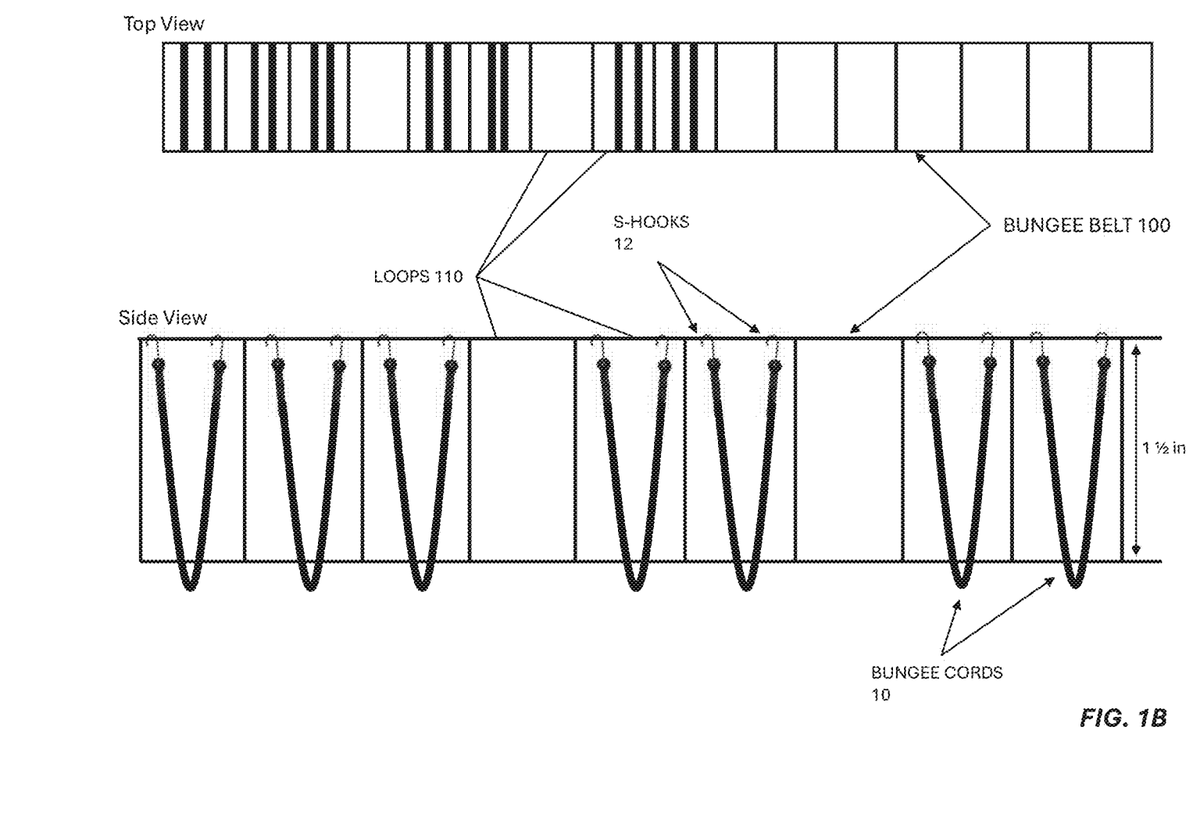
FIG. 1B shows top and side views of bungee cords secured in one row of loops of a bungee belt.
Figure 1C:
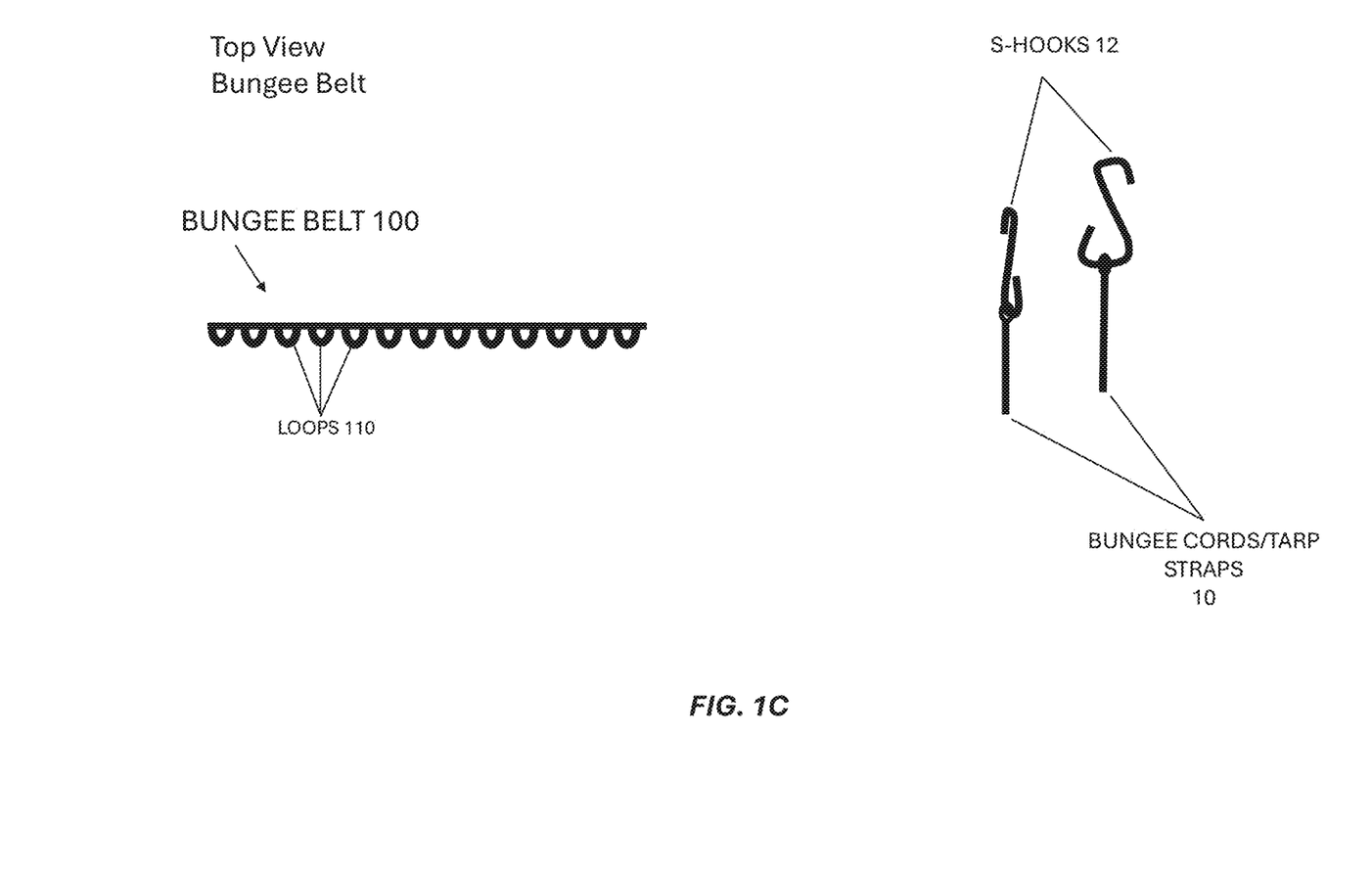
FIG. 1C shows a top view of a bungee belt and side views of an S-hook at the end of a bungee cord.
Figure 1D:
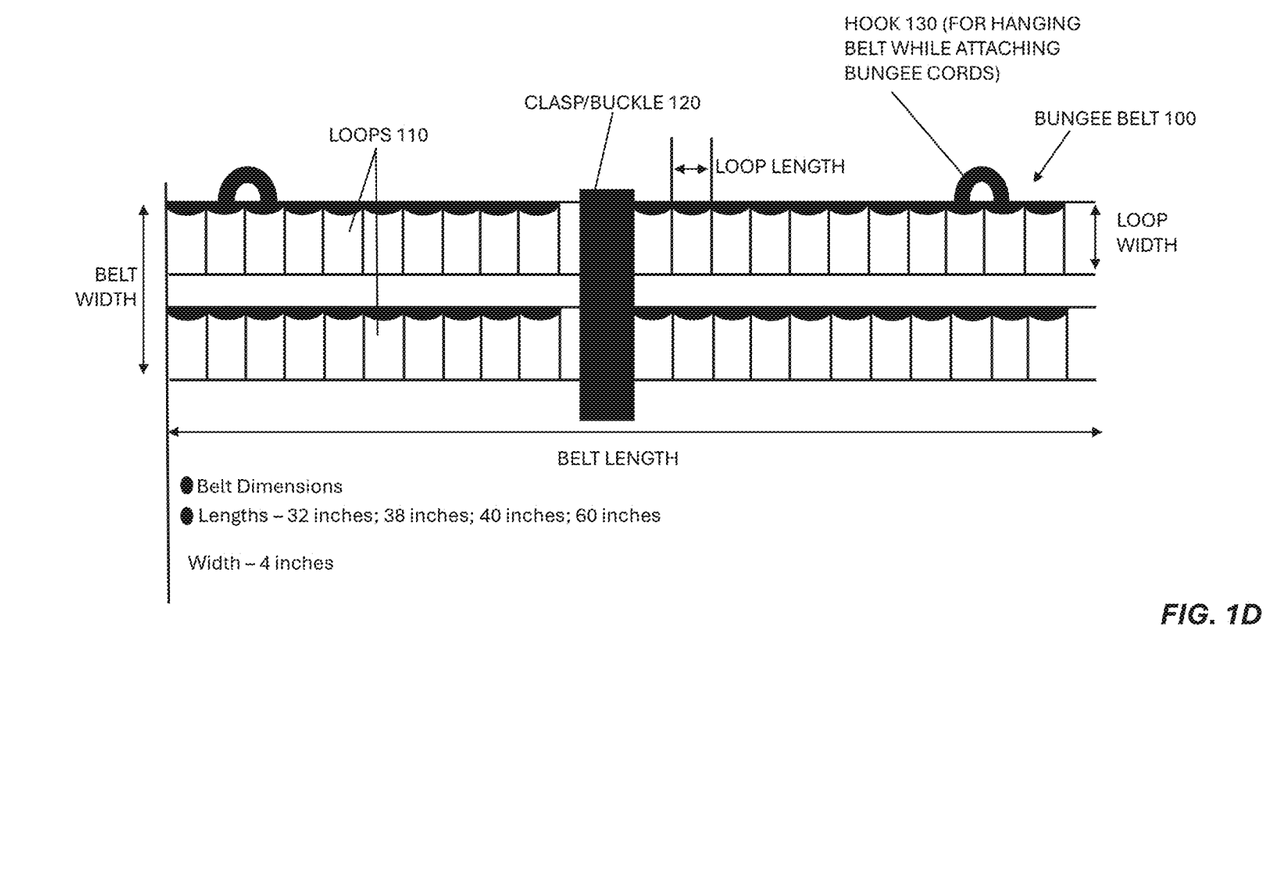
FIG. 1D shows a side view of a bungee belt without any bungee cords.
Figure 1E:
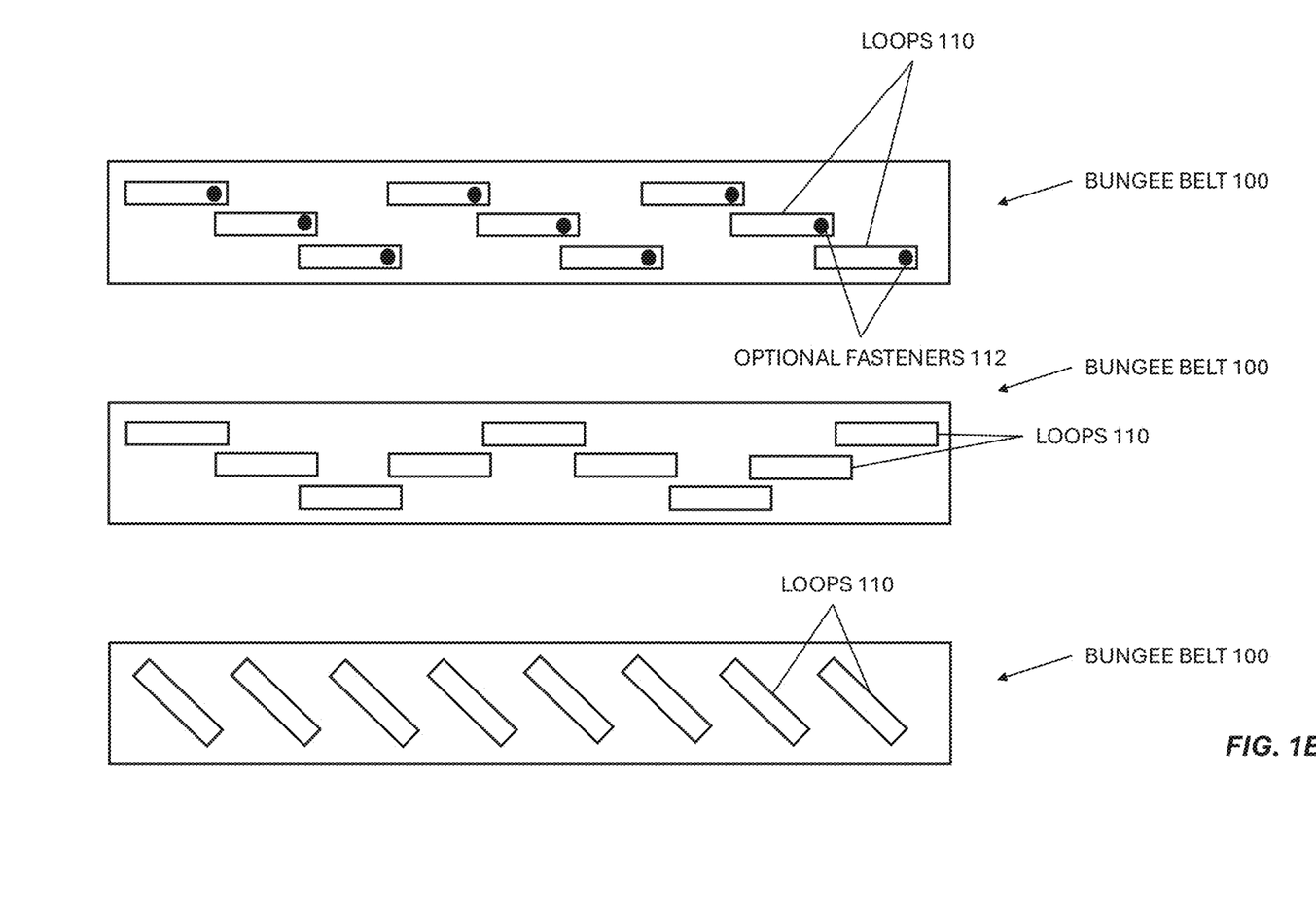
FIG. 1E shows bungee belts with different arrangements of loops for holding bungee cords.
Figure 1F:
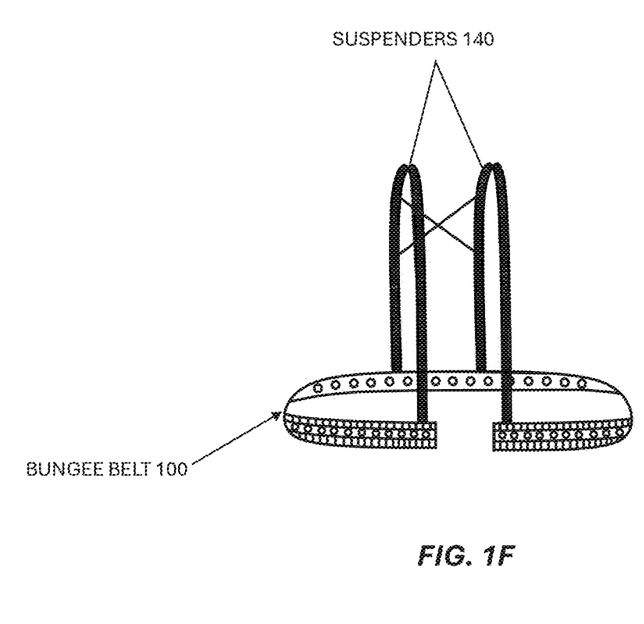
FIG. 1F shows a bungee belt with suspenders.

FIGS. 1A-1F show different views of bungee belts 100 that can reduce or eliminate the number of trips between the tarp and a pile of bungee cords 10, reducing the amount of time it takes to secure the tarp and freeing up time for driving. A bungee belt 100 is a wide belt with loops 110 that can hold enough bungee cords or tarp straps to tarp entire load (e.g., 40, 50, 60, or 70 bungee cords or tarp straps). The bungee belt 100 is made of rugged material, such as nylon, polyester, Kevlar® synthetic fiber, Nomex® synthetic fiber, Dyneema® synthetic fiber, leather, or another suitable material. This material can be thick and/or arranged in multiple layers to provide additional strength and support. The bungee belt 100 can also be padded, e.g., at the hips and/or along the back, for comfort and/or extra support. In addition, the bungee belt 100 can have shoulder straps or suspenders 140 as shown in FIG. 1F to distribute the weight of the bungee belt 100 and bungee cords 10 onto the person's shoulders. The padding, shoulder straps, and/or suspenders 140 can be attached permanently to the belt material or attached with detachable snaps, buckles, clips, or other fasteners.

Like a regular belt, a bungee belt 100 includes a buckle, clasp, or other suitable fastener 120 at the front or side as shown in FIG. 1D so that it can be secured around a person's waist. This fastener 120 can be made of metal, plastic, or any other suitable material that is strong enough to support the weight of the bungee cords hung from the belt without bending. The fastener 120 can be secured well enough so that it doesn't come undone when a person wears the bungee belt 100. And the fastener 120 can be used to tighten or loosen the bungee belt 100, which may come in a variety of lengths, including, without limitation, 28, 30, 32, 34, 36, 38, 40, or 60 inches.

The bungee belt 100 is relatively wide (e.g., 3, 3.5, 4, 4.5, or 5 inches wide) and has loops 110 to hold the ends of 40, 50, 60, 70, or more bungee cords or tarp straps 10. There may be one loop 110 per bungee cord 10 (e.g., 60 loops for 60 bungee cords) or one loop 110 per bungee cord end (e.g., 120 loops for 60 bungee cord). The loops 110 are oriented to form openings that face up and down when the bungee belt 100 is worn by a person standing upright. The loops 110 can also be canted or tilted, e.g., by 30°, 45°, or 60°, so that the openings are tilted as shown at the bottom of FIG. 1E. The loops 110 can all be oriented in the same direction or in different directions, e.g., in a zig-zag pattern or undulating pattern as shown in FIG. 1E. Each loop 110 forms an opening that is large enough to accommodate a pair of S-hooks 12 and snug enough to prevent the S-hooks 12 from falling out of the loop 110.

The loops 110 can be arranged in a single row or in two or more parallel rows, e.g., with equal numbers of loops in each row as shown in FIGS. 1A and 1D. The loops can also be staggered or arranged in a pattern (e.g., an undulating or wave-like pattern) as in FIG. 1E. For example, a bungee belt 100 may include 30 loops in an upper row and 30 loops in a lower row, with the loops in the different rows aligned with each other as in FIG. 1D or staggered or offset laterally from each other. A row of loops 110 can be formed by a single strip of belt material (e.g., nylon, polyester, etc.) that is double-, triple-, or quadruple-stitched, riveted, or otherwise fastened to the belt 100 itself to form the loops 110, with stitches spaced along the belt at a distance wide enough to leave room for each loop 110 and close enough to fit all of the loops around the belt, e.g., every 2, 3, or 4 inches. Alternatively, a loop 110 or set of loops 110 can be formed of a discrete strip of belt material that is stitched, riveted, or otherwise fastened to the belt 100. These discrete strips can be vertically, horizontally, or diagonally staggered or offset from each other so that the loops 110 can hold the desired number of bungee cords 10 without the bungee cords 10 becoming tangled.

In another alternative, one end of each loop 110 can be permanently fastened to the belt 100 and the other end can be detachably coupled to the belt, e.g., with a snap, hook, buckle, or other suitable detachable fastener 112 as shown in FIG. 1E. If the detachable fastener 112 is secure enough when affixed to the belt 100 (e.g., a snap), each end of each loop 110 can be affixed to the belt with a corresponding detachable fastener 112.

The loops 110 and belt 100 can be made of the same material or different materials. For example, the loops 110 may be made of or include an elastic material that stretches to accommodate the S-hooks 12 and springs back into shape to hold the S-hooks 12 snugly, preventing the S-hooks 12 from falling out of the loops 110. The loops 110 are generally narrower than the belt 100 itself. The loops 110 may be wide enough so that the S-hooks 12 at the ends of the bungee cords 10 are not exposed, that is, they may be wider than the length of the usable portion of the S-hook 12 extending from the bungee cord. For instance, each loop may be about 1.5 inches wide as measured along the width of the belt 100 as shown in FIGS. 1A, 1B, and 1D. For a 4-inch belt with two rows of loops 110, this leaves up to 1 inch of bare belt between the rows of belts as shown in FIGS. 1A and 1B. Othe0r loop widths are also possible, including 0.5, 0.75, 1.0, 1.25, 1.5, or 1.75 inches for a 4-inch belt with one or two rows of loops 110.

The bungee cords 10 can be hooked into the belt as shown in FIGS. 1A and 1B, where the both S-hooks 12 for each bungee cord 10 are hooked into a single loop 10. Different ends of a single bungee cord 10 can also be hooked into different loops 110, for example, with one end in the top row of loops 110 and the other end in the bottom row of loops 110. A trucker can put S-hooks 12 of the bungee cords 10 in the belt loops 110 while the belt 100 is on a flat surface, such as a flatbed trailer, a shelf, or the ground, or while the belt 100 is hanging from one or more hooks in a ceiling, wall, or other structure.

As shown in FIG. 1D, the belt 100 can have additional loops, eyelets, hooks, or other reinforced openings 130 that can used for suspending or hanging the belt 100 while attaching bungee cords 10 to the belt 100. These additional loops 130 can extend or open upwards for easier hanging. They can also accommodate clip-on suspenders or can clip to other webbing or garments.

Once the S-hooks 12 are in the loops 110, the trucker can secure the belt 100 around his or her waist with the bungee cords 10 remaining securely held in place on the belt 100 by the loops 110. While wearing the belt 100, the trucker can secure the tarp to the flatbed using the bungee cords 10 on the belt 100. Instead of walking back and forth between the flatbed and a pile of bungee cords, the trucker can simply pull each bungee cord 10 from the belt 100 around his or her waist, then strap it to the appropriate rub rail or D-hook. This saves time and effort for the trucker.

Figure 2A:
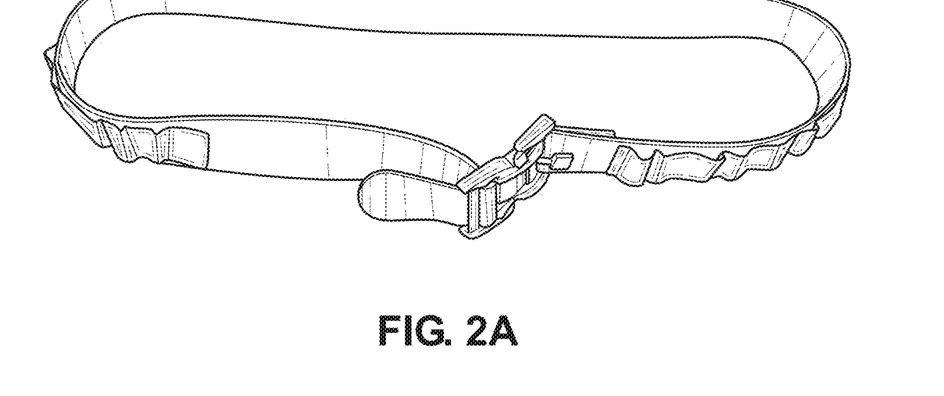
FIG. 2A is a photograph of a bungee belt with a buckled clasp and a single row of loops from the front.
Figure 2B:
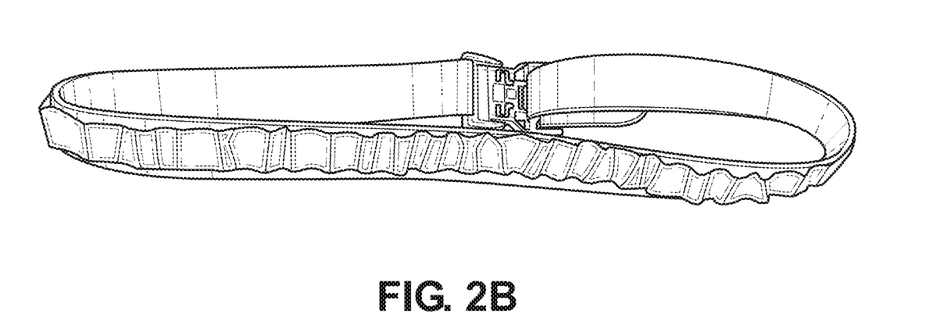
FIG. 2B is a photograph of the bungee belt of FIG. 2A from the back.
Figure 2C:
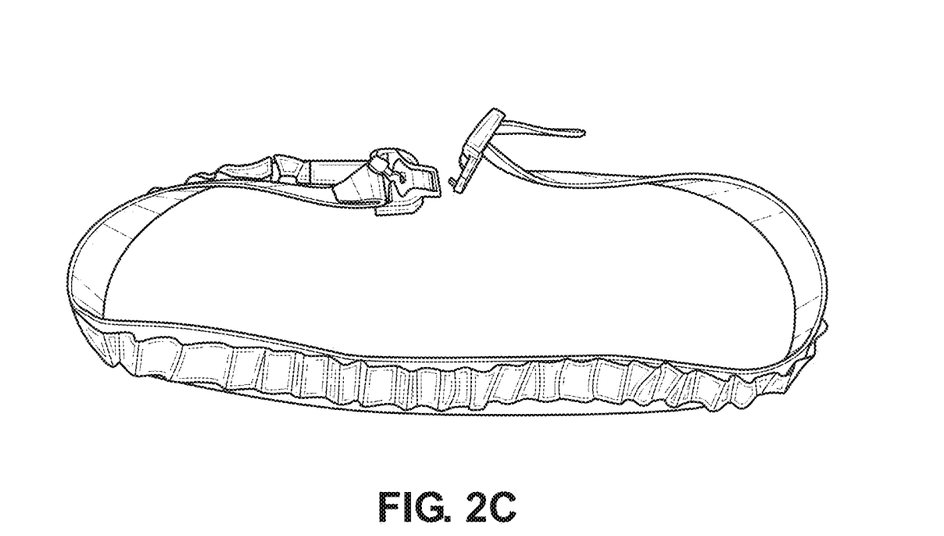
FIG. 2C is a photograph of the bungee belt of FIGS. 2A and 2B with the clasp unbuckled from the back.

FIGS. 2A-2C are photographs of a bungee belt with a single row of loops. FIG. 2A and 2B shows the bungee belt from the front and back, respectively, with the clasp or buckle fastened. FIG. 2C shows the bungee belt from the top with the clasp unfastened. The loops on this bungee belt are formed by a single piece of elastic/stretchable material stitched at intervals (e.g., intervals of 0.25, 0.5, 0.75, 1.0, 1.25, 1.5, 1.75, or 2 inches) to the outer circumference of the belt. This piece of material is longer than the belt so that it forms loops with openings that face up and down when the belt is worn by a person standing upright. When the hooks of the bungee cords are hooked into the loops while the person is wearing the bungee belt, the bungee cords hang down from the person's waist to about their knees, depending on the person's height and the length(s) of the bungee cords.

Figure 3:
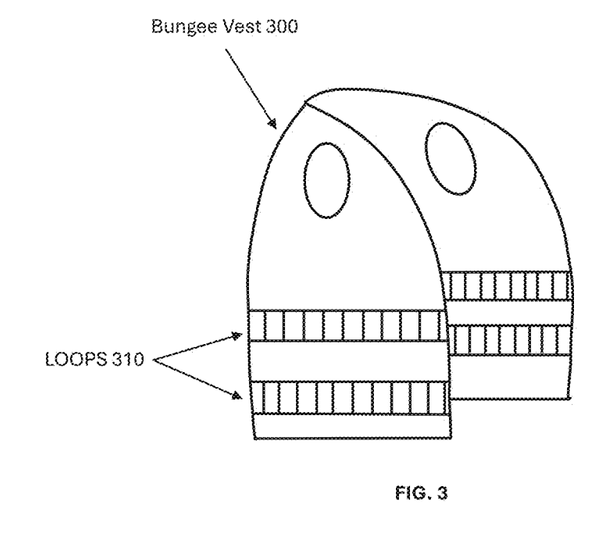
FIG. 3 shows a bungee vest with loops for holding bungee cords arranged around the waist.

FIG. 3 shows a bungee vest 300 with loops 310 for holding bungee cords. Like the loops 110 on the bungee belt 100, these loops 310 are arranged and oriented to have openings that face up and down when the bungee vest 300 is worn by a person standing upright. The loops 310 can be arranged in one or more rows around the waist, as shown in FIG. 3, or in a pattern like those shown in FIG. 1E. Because the bungee vest 300 has a much larger area of fabric than a belt, it can have more loops 310 and those hold more bungee cords 10. For instance, the bungee vest 300 may also include one or more loops 310 on its front and/or side, either in addition to or instead of the loops around the waist. Distributing the loops 310 on the front and/or side can also make carrying a fully loaded bungee vest 300 more comfortable and can make it easier to attach the bungee cords 10 to the bungee vest 300 and detach the bungee cords 10 from the bungee vest 300.

The examples above focus mainly on using a bungee belt to hold bungee cords or tarp straps for strapping a tarp over a load on a flatbed truck or trailer. These bungee cords or tarp straps can be used for other things as well, for example, for securing items other than a tarp to a flatbed truck or trailer or for securing a tarp to something other than a flatbed truck or trailer. For instance, the bungee cords could be used to secure a load directly to a flatbed or to secure a tarp to or over one or more items that aren't on a flatbed. A bungee belt can also be used to hold other items, including other cords or cables (e.g., electrical cords or cables) or items with hooks or similarly shaped pieces of metal or plastic.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A belt holding bungee cords for securing a tarp over a load on a flatbed truck, the belt having a width of three inches to five inches and loops along its outer circumference, the loops holding respective hooks of the bungee cords.

2. The belt of claim 1, wherein the belt is made of at least one of nylon, polyester, synthetic fiber, or leather.

3. The belt of claim 1, wherein the loops are arranged in two parallel rows separated by up to one inch.

4. The belt of claim 1, wherein each of the loops is 0.5 inches to 1.75 inches wide.

5. The belt of claim 1, wherein the loops are arranged in a staggered fashion.

6. The belt of claim 1, wherein the loops are oriented with openings facing up and down when the belt is worn by a person standing upright.

7. The belt of claim 1, wherein the loops are oriented with openings facing at an angle with respect to the ground when the belt is worn by a person standing upright.

8. The belt of claim 1, wherein the belt includes at least thirty loops.

9. The belt of claim 1, wherein the belt includes at least forty loops.

10. The belt of claim 1, wherein the belt includes at least fifty loops.

11. The belt of claim 1, wherein the belt includes at least sixty loops.

12. The belt of claim 1, wherein the loops are formed from a single piece of material secured to the belt.

13. The belt of claim 1, further comprising suspenders.

14. A method of securing a tarp over a load on a flatbed truck using bungee cords and a belt with loops to hold S-hooks of the bungee cords, the method comprising:
inserting the S-hooks of the bungee cords into respective loops of the belt;
putting on the belt while the S-hooks of the bungee cords are in the respective loops of the belt;
while wearing the belt, removing the S-hooks of the bungee cords from the respective loops of the belt; and
securing the tarp over the load with the bungee cords.

15. A belt for holding bungee cords for securing a tarp over a load on a flatbed truck, the belt having a width of three inches to five inches and at least thirty loops configured to hold hooks of the bungee cords,
wherein the belt is made of at least one of nylon, polyester, synthetic fiber, or leather,
wherein the at least thirty loops are arranged in multiple rows in a staggered, undulating, or wave-like pattern and oriented with openings facing up and down when the belt is worn by a person standing upright.

16. The belt of claim 15, further comprising suspenders.

17. The belt of claim 15, wherein the at last thirty loops are stitched at intervals of 0.25 inches to 2 inches about an outer circumference of the belt.

18. The belt of claim 15, further comprising:
detachable fasteners attaching the at least thirty loops to the belt.

19. The belt of claim 15, in combination with the bungee cords, wherein the at last thirty loops are holding the hooks of the bungee cords.

* * * * *